UNITED STATES PATENT OFFICE.

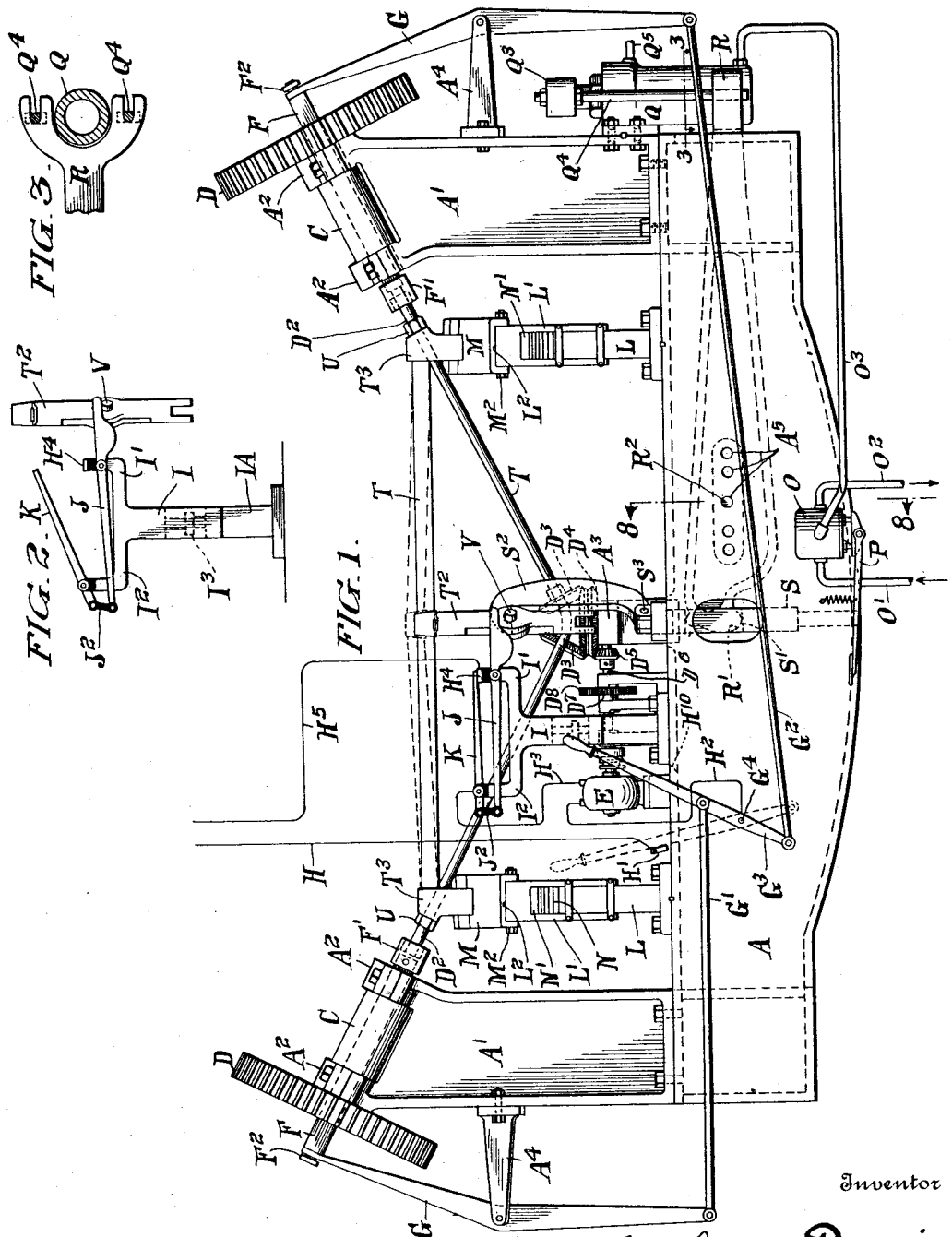

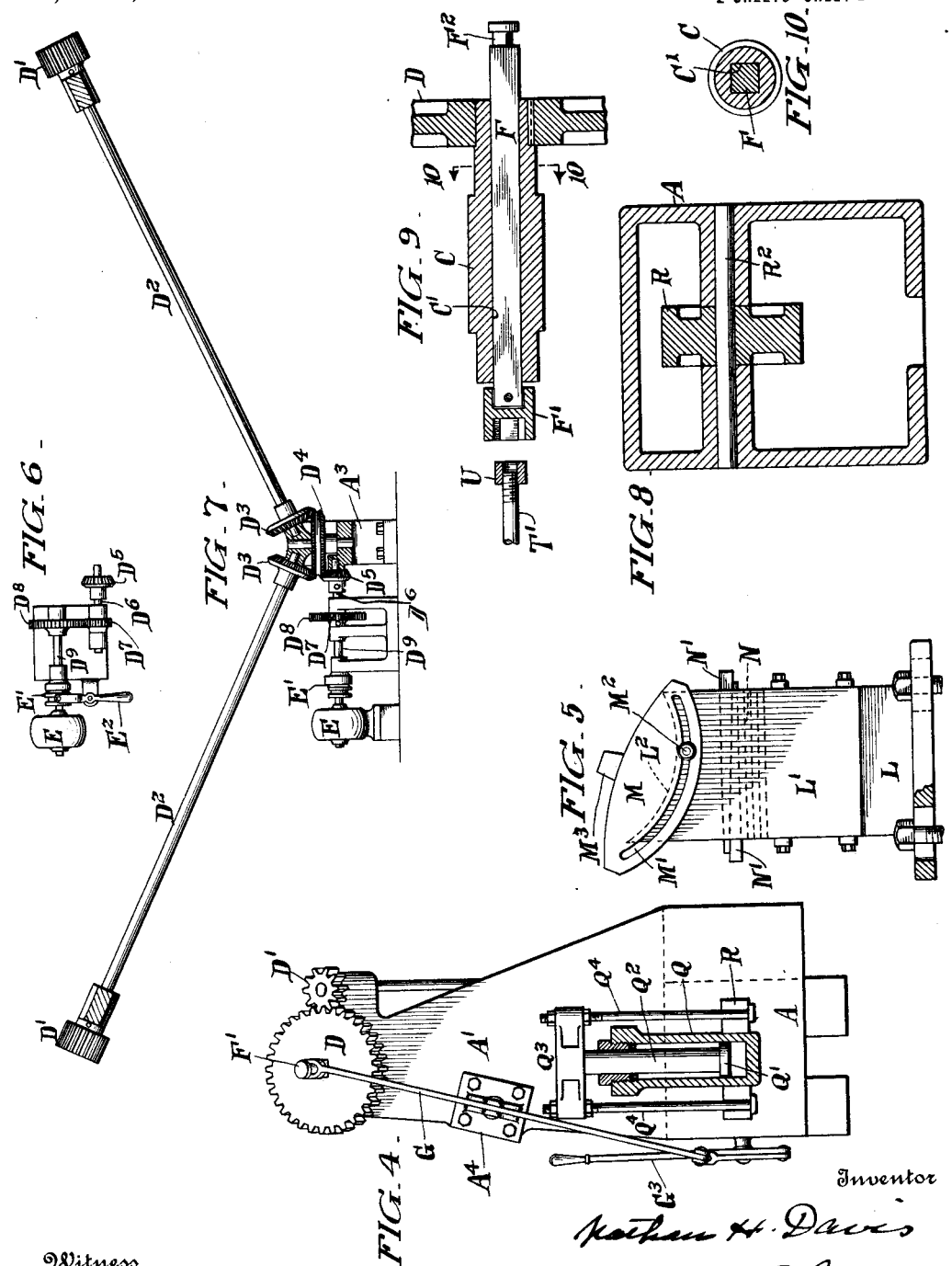

NATHAN H. DAVIS, OF PHILADELPHIA, PENNSYLVANIA.

BRAKE-BEAM-ASSEMBLING MACHINE.

1,182,356.  Specification of Letters Patent.  Patented May 9, 1916.

Application filed August 4, 1915. Serial No. 43,550.

*To all whom it may concern:*

Be it known that I, NATHAN H. DAVIS, a citizen of the United States, residing in the city and county of Philadelphia, in the State of Pennsylvania, have invented certain new and useful Improvements in Brake-Beam-Assembling Machines, of which the following is a true and exact description, reference being had to the accompanying drawings, which form a part thereof.

My present invention relates to a machine for assembling structures comprising parts bolted together, and was primarily devised, and is especially adapted for use in assembling railway brake beams of the kind in which the truss rod of the beam is threaded at its ends to receive nuts by which the various parts of the beam are rigidly clamped together.

My brake beam assembling machine in the form illustrated comprises adjustable supports for the ends of the brake beam operated upon, power actuated wrenches for simultaneously engaging and screwing up the nuts on the opposite ends of the truss rod, with provisions for automatically controlling the extent to which the nuts are tightened up, and mechanism for engaging the strut of the beam and applying a force thereto to assist in setting the beam in its final shape and to test the mechanical strength of the beam.

The various features of novelty which characterize my invention are pointed out with particularity in the claims annexed to and forming a part of this specification. For a better understanding of the invention, however, and of the advantages possessed by it, reference should be had to the accompanying drawings and descriptive matter in which I have illustrated one embodiment of my invention.

Of the drawings: Figure 1 is an elevation of the complete machine; Fig. 2 is an elevation of a detail of the machine shown in Fig. 1; Fig. 3 is a partial sectional plan taken on the line 3—3 of Fig. 1; Fig. 4 is a partial end view of the machine with a portion of the mechanism shown in section; Fig. 5 is an end elevation of one of the work supports; Fig. 6 is a plan view of the driving motor and a portion of the power transmitting mechanism; Fig. 7 is an elevation illustrating details of the power transmitting mechanism; Fig. 8 is a section through the base of the machine taken on the line 8—8 of Fig. 1; Fig. 9 is a sectional elevation taken through the axis of one of the wrench mechanisms; and Fig. 10 a section taken on the line 10—10 of Fig. 9.

In the drawings, A represents the heavy metallic base of the machine, and A' represents standards or brackets secured to the upper ends of the base. Each standard A' is provided at its upper end with bearings $A^2$ for a corresponding sleeve or hollow longitudinal shaft C. The two longitudinal shafts C are inclined to one another to lie in substantial alinement with the two halves of the truss rod T' of the brake beam operated upon. Each sleeve or shaft C has secured to its outer end a gear D by means of which and coöperating gearing the shaft C is rotated by an electric motor E. As shown the coöperating gearing comprises spur gears D' in mesh with the gears D and carried on corresponding inclined spindles $D^2$ which at their converging inner ends carry bevel gears $D^3$ meshing with the double bevel gear $D^4$. The latter is also in mesh with the bevel gear $D^5$ carried by a countershaft $D^6$ which is geared to a shaft $D^9$ by spur gears $D^7$ and $D^8$. The shaft $D^9$ is in alinement with the shaft of the motor E and is adapted to be connected and disconnected therefrom by the friction clutch E' and the operating lever $E^2$ therefor. The shafts $D^2$ are journaled at their outer ends in the standards A' and at their inner ends on the central block or support $A^3$.

Slidingly but non-rotatively mounted in each sleeve or hollow shaft C is a corresponding wrench spindle F proper. As shown, the spindles F are square in cross section, and the passages C' in the sleeves C are also square in cross section. To longitudinally traverse, *i. e.*, axially advance and retract the wrench spindles F, each of the latter is formed at its outer end with a groove $F^2$, the walls of which engage the forked end of a corresponding lever G. Each lever G is fulcrumed on a bracket $A^4$ secured to the standard A', and the two levers G are connected, one by a link G' and the other by a link $G^2$, to an operating lever $G^3$ at opposite sides of the fulcrum point $G^4$ of the lever. In the position shown in Fig. 1, the spindles F are retracted so that the socket wrench members F' secured to the inner ends of the spindles F are out of engagement with the nuts U on the ends of the truss rod. By shifting the lever $G^3$ from the full line position to the dotted line position shown in Fig. 1, the socket members F' are advanced to fit over the nuts U. In the form shown the lever G³ also serves, when moved into the dotted line position, to close the operating circuit for the motor E. This circuit includes the supply conductors H and H⁵, the stationary contact H' to which conductor H is connected to the lever G³, a conductor H² connecting the lever G³ to one terminal of the motor E, the conductor H³ leading from the other terminal of the motor to the automatic switch lever K, and the stationary contact H⁴ to which the supply conductor H⁵ is connected. In the condition of the apparatus shown in Fig. 1, the switch arm K engages the contact H⁴, thus connecting the conductors H³ and H⁵. Under certain conditions, hereinafter referred to, the switch lever K is moved away from the contact H⁴ as shown in Fig. 2, by means of the lever J which is connected to the switch arm K by the insulation link J². The levers J and K are pivoted to the opposite branches I' and I² of a post made in two sections, I and I^A, to permit the upper section I to be raised and lowered as by means of the adjusting screw I³.

The brake heads T³ of the brake beam being operated on seat on work rests M. The rests M are mounted on and form a part of adjustable work supports or stands each comprising a post like portion L detachably clamped to the base A, and a portion L' telescoping on the part L and adapted to be held at different elevations by means of the shims N and wedges N'. Each stand part L' is formed at its upper end with a curved seat L² for the corresponding work rest M which can be rocked in the seat L², and can be secured in any desired angular adjustment by means of the clamping bolt M² passing through slots M' in the flange portions of the work support M. As shown each work support is formed with a positioning lug M³ adapted to enter the usual central slot of the brake head T engaging the work support. The angular adjustment of the work rests in their curved seats L² permits the beam strut T² to be kept vertical, and the brake heads kept in proper engagement with the work rests M notwithstanding such variations in the angular setting of the brake heads with respect to the beam as are found in different kinds or adjustments of beams.

In conjunction with the mechanism described I have provided, in the machine shown, means for applying to the brake lever strut a force for the purpose of testing the strength of the beam and for giving a set to the parts thereof during the assembling operation. The means which I have provided for this purpose comprise a fluid pressure cylinder Q secured to one end of the stationary frame work of the machine, a differential piston Q' working therein and having its piston rod Q² connected to a crosshead Q³. The latter is connected by the bolts Q⁴ to the adjacent slotted end of a lever R which is adjustably connected to the base member A of the machine by means of the fulcrum pin R² resting in one or another of a set of apertures A⁵ formed in the base member A, and corresponding apertures in the lever R. The opposite end R' of the lever R engages a vertically movable bar S. Pivotally connected at S³ to the upper end of the bar S is a hook S² adapted to pass into the slot in the brake beam strut member T² and take over the fulcrum pin V, traversing said slot. O⁵ represents a pipe by which the upper end of the cylinder Q may be connected to a source of fluid pressure, and O represents a valve by means of which the lower end of the cylinder Q may alternately be connected to the source of fluid pressure or to exhaust.

O' represents the supply pipe running to the valve O, O² the exhaust pipe leading away from the valve, and O³ the pipe running from the valve to the lower end of the cylinder R.

P represents an operating treadle lever for the valve O.

In operation the beam is put in place with the two brake heads resting on the work supports M and ordinarily with the nuts U started on the threaded ends of the truss rod T'. After the beam is properly in place the lever G³ is moved away from the full line position into the dotted line position in which the socket wrenches F' take over the nuts U. As the lever G³ moves into the dotted line position and the wrenches are properly fitted on the nuts the lever G³ engages the contact H', thus closing the energizing circuit of the motor E. This starts the motor E in operation and the nuts U are screwed up until the consequent camber given the compression member of the beam, T, elevates the strut T² so that the fulcrum pin V engages the lever J and thereby moves the switch arm K into the open position shown in Fig. 2, thus opening the motor circuit and stopping the motor E. With the wrench mechanism employed the two nuts U are each screwed home at the same rate and to the same extent.

In one mode of operation of the machine, the hook S² and its actuating mechanism do not come into play during the initial setting up of the nuts. After this initial setting up of the nuts U and the movement of the switch arm K to the open position, the valve O is manipulated to admit pressure fluid to the lower end of the cylinder Q, the pressure fluid, then acting on the differential piston Q' raises the latter so that the end R' of the lever R engages the shoulder S' of the member S and exerts a downward pull on the strut member T² through the hook S² which has previously been moved into engagement with the fulcrum pin V. This serves to give a permanent set to the brake beam parts, reduces the tension on the nuts by in effect elongating the truss rod, and lowers the pin V sufficiently to permit the switch arm K to again engage the contact H⁴. This starts the motor E into operation which continues until the nuts are screwed down until the fulcrum pin V is again raised so that the lever J causes the switch arm K to open the motor circuit. This completes the operation of assembling a brake beam and the lever G³ is then swung into the full line position of Fig. 1 to permit the removal of the assembled beam and the putting in place of a new beam.

In lieu of supplying pressure fluid to the lower end of the cylinder Q only after an initial setting up of the nuts U the pressure fluid may be admitted to the lower end of the cylinder Q at the beginning of the assembling operation. In this case the entire screwing home of the nuts will be done against the pull exerted on the tension rod through the testing lever R. When this mode of operation is followed the brake beam parts will be given their permanent set and the assembling operation completed by the time the switch arm K is first moved into the position of Fig. 2 by the corresponding elevation of the strut T². With this mode of operation the hook S² forms a means by which the beam is firmly held against the work rests M in all stages of the assembling operation performed by the machine.

It is, in general, essential that the fulcrum pin V of the beam should be at a predetermined distance in front of the brake heads. This is automatically effected with the mechanism shown, through the lever J and switch arm K which is opened by the lever J when the fulcrum pin V is brought to the proper position in relation to the brake heads. The setting of the work rests M and the vertical adjustment of the work supporting standards and of the switch supports I and I^A, will obviously depend on the kind or adjustment of the brake beam operated on, and the distance in front of the brake head at which it is desired to have the fulcrum pin V located.

It will be readily apparent to those skilled in the art that various changes may be made in the form of the apparatus illustrated without departing from the spirit of the invention set forth in the annexed claims.

Having now described my invention, what I claim as new and desire to secure by Letters Patent, is:—

1. In a machine of the character described, a pair of supports adapted to receive a brake beam having a screw threaded member provided with nuts on the ends thereof, a pair of socket wrenches adapted to receive said nuts, rotatable shafts on which said socket wrenches are mounted, means for traversing said shafts longitudinally and for rotating the same, whereby the nuts are screwed as tightly as desired.

2. A machine of the character described, comprising a pair of adjustable supports adapted to receive a brake beam, and capable of vertical adjustment, the upper surface of said supports being adapted to be adjusted rotatably to incline the upper surfaces as desired, means coöperating with the brake beam adapted to clamp the same on said supports, and power driven wrenches adapted to screw the nuts on the ends of the threaded members of the brake beam.

3. A brake beam assembling machine comprising a pair of supports adapted to receive a brake beam, means for adjusting said supports, means coöperating with the brake beam adapted to hold the same firmly on said supports, a pair of socket wrenches mounted on rotatable shafts adapted to coöperate with the nuts of the threaded member of the brake beam, power means for rotating said wrenches, and means for traversing them longitudinally, whereby the nuts are screwed as tightly as desired.

4. In a machine for assembling truss brake beams, the combination with beam supporting means, wrench mechanisms for engaging nuts at the opposite ends of a beam engaging said supporting means, and means for subjecting said beam to a transverse stress.

5. In a machine for assembling truss brake beams, the combination with supports for the ends of the beam, of wrench mechanisms for engaging the truss rod nuts of a truss brake beam engaging said supports and means for engaging the beam at its center and exerting thereon a transverse force.

6. In a machine for assembling truss brake beams, the combination with supports for the ends of the beam, of wrench mechanisms for engaging the truss rod nuts of a truss brake beam engaging said supports, and means for engaging the strut of said truss beam and exerting a force there in a direction tending to strain the tension rod of the beam, said means comprising a strut engaging hook and a power transmitting lever.

7. In a machine for assembling truss brake beams, the combination with a frame work including supports for the ends of the brake beam of wrench mechanisms for engaging the truss rod nuts of a beam engaging said supports, a lever pivotally connected to said frame work, means for connecting one end of said lever to the strut of the brake beam and power means engaging the other end of the lever.

8. In a machine for assembling truss brake beams, the combination with supports for the ends of the beam, wrench mechanisms for engaging the truss rod nuts at the opposite ends of the beam and means responsive to the position of the beam strut for indicating when the tightening of said nuts has moved the strut into a predetermined position relative to the beam.

9. In a machine for assembling truss brake beams, the combination with supports for the ends of the beam, wrench mechanisms for engaging the truss rod nuts at the opposite ends of the beam, and means responsive to the displacement of the beam strut resulting from the tightening of said nuts for controlling the operation of said wrench mechanisms.

10. In a machine for assembling truss brake beams, the combination with work supports for the ends of the beam comprising work rests adapted to be engaged by the brake heads on the ends of the beam and each adjustable angularly about an axis parallel to the length of the beam and in a direction transverse to the length of the beam, wrench mechanisms adapted to engage the truss rod nuts at the opposite ends of the beam and strut engaging means for subjecting the beam to a regulated transverse stress.

11. In a machine for assembling truss brake beams, the combination with work supports for the ends of the beam of wrench mechanisms for tightening the truss rod nuts at the opposite ends of the beam, said mechanisms including rotatable wrench parts movable into and out of engagement with said nuts, means for moving said wrench parts into and out of engagement with said nuts, and means for simultaneously imparting equal angular turning movements to said wrench parts.

NATHAN H. DAVIS.

Copies of this patent may be obtained for five cents each, by addressing the "Commissioner of Patents, Washington, D. C."